United States Patent [19]

Imamura

[11] Patent Number: 5,082,095
[45] Date of Patent: Jan. 21, 1992

[54] LOCK-UP CLUTCH PRESSURE CONTROL DEVICE

[75] Inventor: Hiroyuki Imamura, Shizuoka, Japan
[73] Assignee: Jatco Corporation, Japan
[21] Appl. No.: 578,198
[22] Filed: Sep. 6, 1990
[30] Foreign Application Priority Data

Sep. 8, 1989 [JP] Japan ................................. 1-233997

[51] Int. Cl.⁵ ............................................. F16H 45/02
[52] U.S. Cl. ................................................... 192/3.3
[58] Field of Search ........................... 192/3.3; 74/890

[56] References Cited

U.S. PATENT DOCUMENTS

| | | | |
|---|---|---|---|
| 4,468,988 | 9/1984 | Hiramatsu | 74/890 X |
| 4,843,920 | 7/1989 | Hayasaki et al. | 192/3.3 X |
| 4,880,090 | 11/1989 | Ando | 192/3.3 |
| 4,966,263 | 10/1990 | Hayasaki | 192/3.57 X |

FOREIGN PATENT DOCUMENTS

| | | | |
|---|---|---|---|
| 57-33253 | 2/1982 | Japan . | |
| 0260761 | 12/1985 | Japan | 192/3.3 |
| 2172348 | 9/1986 | United Kingdom . | |

*Primary Examiner*—Rodney H. Bonck
*Attorney, Agent, or Firm*—Ronald P. Kananen

[57] ABSTRACT

A spool of a lock-up control valve is arranged to have equal pressure differential areas exposed to the apply and release pressures applied to the apply and release chambers of the lock-up clutch. The movement of the spool is determined by changes in a single variable level pressure and independent of the apply pressure.

10 Claims, 6 Drawing Sheets

FIG.5
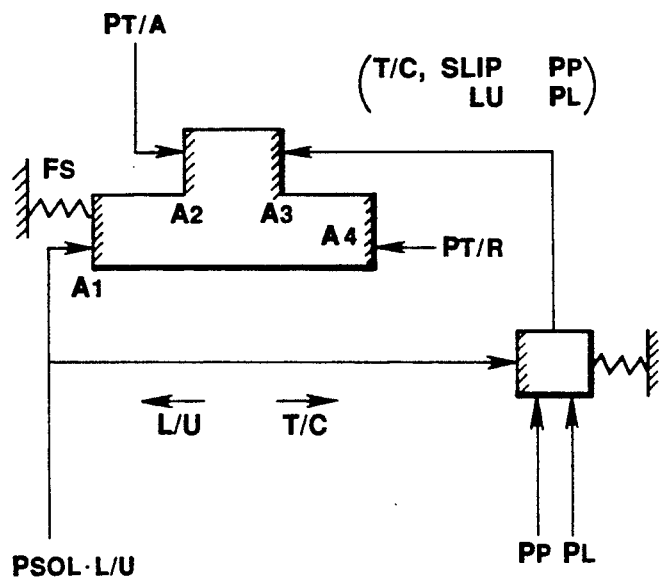
FIG.6
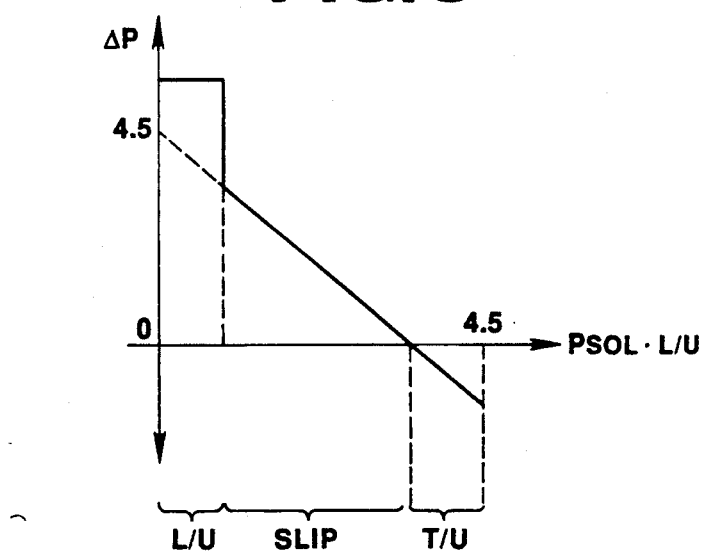
FIG.8 *PRIOR ART*
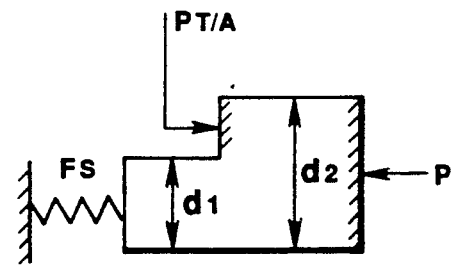

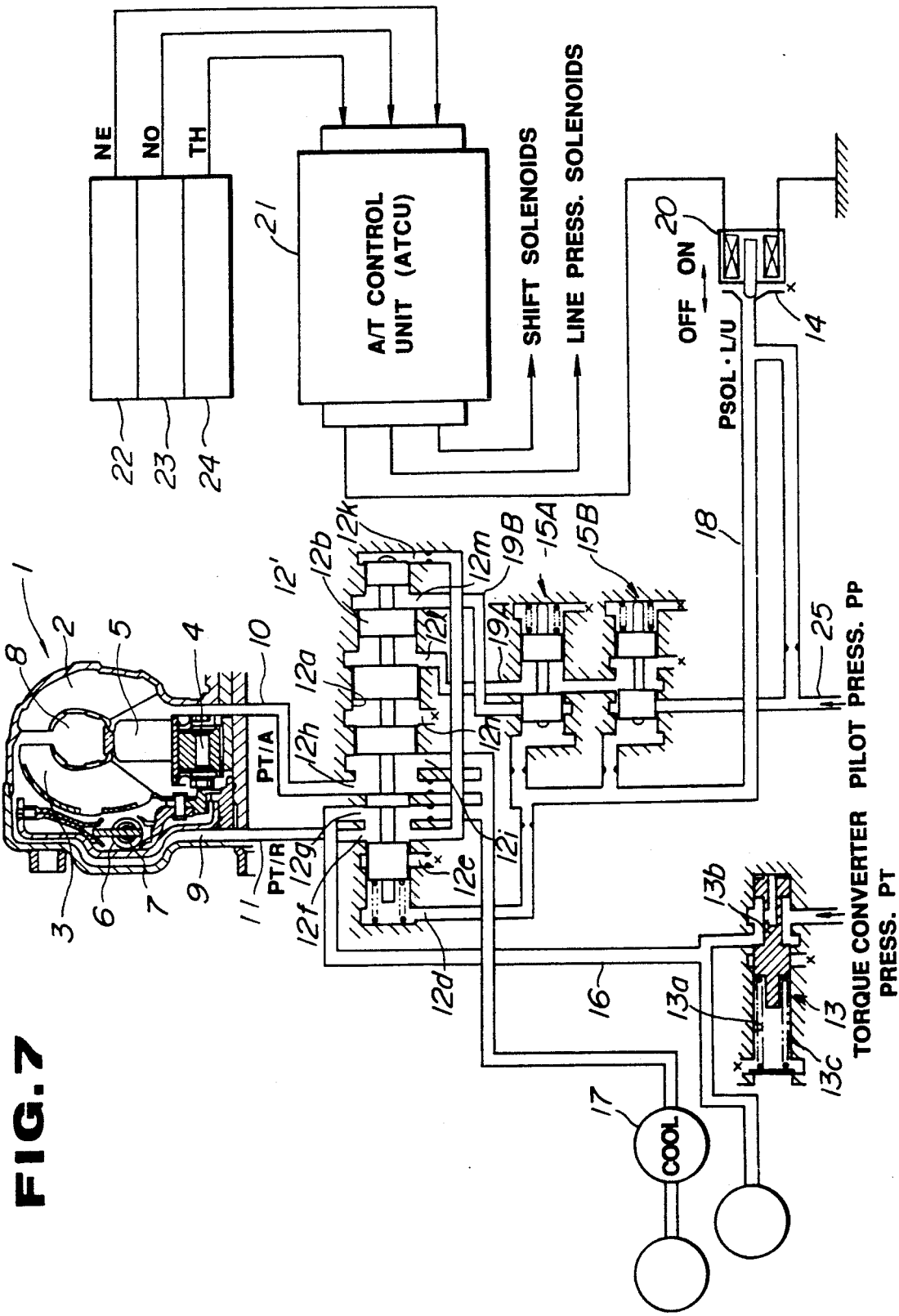

LOCK-UP CLUTCH PRESSURE CONTROL DEVICE

BACKGROUND OF THE INVENTION

1. Field of the Invention

The present invention relates generally to a hydraulic control system for an automatic automotive type transmission and more specifically to a lock-up arrangement for use with such a system.

2. Description of the Prior Art

JP-A-57-33253 discloses a lock-up control arrangement which includes a lock-up apply chamber and a lock-up release chamber. A valve spool which is associated with the two chambers has first and second pressure responsive areas which are respectively exposed to the pressures in the apply and release chambers.

This arrangement however has suffered from the drawbacks that as the first and second pressure responsive areas of the spool have different areas, in the event that the pressure in the apply chamber suddenly increases the pressure differential between the apply and release pressures (which produces the clutch application force) cannot be maintained at a desired response target level. As a result the driving and ride characteristics of the vehicle tend to be deteriorated.

That is to say, during slip lock-up, the pressure differential is controlled by a lock-up solenoid pressure $P_{SOL.L/U}$ and the equilibrium is established in the manner shown in FIG. 8 wherein it can be shown that:

$$F_S + \frac{\pi}{4}(d_2^2 - d_1^2) \times P_{T/A} = \frac{\pi}{4} d_2^2 \times P_{SOL.L/U}$$

$$P_{T/A} = \frac{d_2^2}{d_2^2 - d_1^2} \times P_{SOL.LU} - \frac{4F_S}{(d_2^2 - d_1^2)\pi}$$

Accordingly, during slip lock-up it can be shown that $\Delta P$ is given by:

$$\Delta P = P_{T/A} - P_{T/R} \quad (1)$$

$$= \frac{d_2^2}{d_2^2 - d_1^2} \times P_{SOL.LU} - \frac{4F_S}{(d_2^2 - d_1^2)\pi} - P_{T/R}$$

It should be noted that from equation (1) that the lock-up solenoid pressure $P_{SOL.LU}$ is controlled in a manner to appropriately adjust the pressure differential $\Delta P$ and that $\Delta P$ varies as a function of the solenoid pressure and the apply pressure. Viz., $\Delta P = f(P_{SOL.LU}, P_{T/A})$.

Accordingly, when the amount of depression of the accelerator pedal changes during slip lock-up, the level of the apply pressure $P_{T/A}$ changes (with respect to line pressure $P_L$) thus changing the value of $\Delta P$. As a result, as the level of the solenoid pressure singularly determines $\Delta P$ it has been noted by the inventor that the following detrimental effects are encountered.

[1] If a shift takes place during slip lock-up, the level of the line pressure varies either as a result of the sudden changes in engine speed or a deliberate switching to a different line pressure control schedule, and thus renders it impossible to maintain the desired $\Delta P$ level. As a result of this, lock-up is inappropriately induced. This produces vibration in the lock-up damper and deteriorates the shift and ride characteristics.

[2] during slip lock-up, if the accelerator pedal pumped, the feedback control of the engine and turbine rotational speeds cannot be accomplished and the amount of slip deviates from the desired target value.

[3] When the engine is operating in a low speed zone and the output of the A/T oil pump is accordingly low, slip lock-up is initiated, when the engine load is increased the engine speed tends to decrease with the result that the line pressure exhibits an attendant decrease. The $\Delta P$ value also exhibits a reduction and the amount of slip resultingly increases. As a result of this slip increase, the engine speed also tends to increase and leads to an increase in the line pressure level. The increase in line pressure level also induces an increase in the $\Delta P$ value which tends to return toward the desired level.

That is to say, during the initial stages of slip lock-up, the amount of slip increases and decreases (viz., hunts up and down) for a short period. This of course results in a deterioration of passenger comfort.

When the level of $\Delta P$ is controlled by the level of the solenoid pressure $P_{SOL.L/U}$ the pressure responsive surface area on which the solenoid pressure acts is set a relatively large value whereby a small changed in the solenoid pressure results in large change in the $\Delta P$ value. This leads to the following problems:

[4] The inevitable unit-to-unit deviation in solenoid valves and in the duty cycles of the signal which are applied thereto, induces a very important need to obviate the effects of these phenomenon.

If it is possible to permit a relatively large variation in the solenoid valves, it is possible to achieve a notable reduction in inspection and associated costs. However, if the control gain is set at a high value, the deviation in control tends to maximize it is vital that each solenoid valve exhibit a extremely small unit to unit variation.

[5] For example, if the lock-up solenoid pressure $P_{SOL.LU}$ changes by 0.1 kg/cm² the value of $\Delta P$ changes by the amount of:

$$\frac{d_2^2}{d_2^2 - d_1^2} \times 0.1.$$

With this amount of change, when the vehicle is operating in a high speed zone at full open throttle, lock-up is induced, while during low load intermediate vehicle speed slip lock-up is induced. Viz., it is desired to assuredly maintain lock-up during full throttle modes of operation. At low throttle settings however, when slip lock-up is induced the amount of slip permitted is greatly increased.

Accordingly, even as a result of this very small 0.1 kgm/cm² change in pressure the amount of slip changes ten fold.

Thus, when the slip mode is induced, the amount of slip cannot be expected to be feedback controlled a stable target value. Further, during the change from open converter operation to slip lock-up, as the control or adjustment range is extremely narrow, if the variation in the valve units is large, full lock-up is apt to occur and result in the above mentioned ride deterioration.

SUMMARY OF THE INVENTION

It is an object of the present invention to provide an improved lock-up arrangement which improves the lock-up clutch response characteristics by rendering the control arrangement responsive to a single pressure.

In brief, this object is achieved by an arrangement wherein a spool of a lock-up control valve is arranged to have equal pressure differential areas exposed to the apply and release pressures applied to the apply and release chambers of the lock-up clutch. The movement of the spool is determined by changes in a single variable level pressure and independent of the apply pressure.

More specifically, a first aspect of the present invention comes in a transmission having a driving element; a driven element operatively connected with the driving element in a manner rotational energy can be transferred therebetween; and a lock-up clutch operatively arranged between the driving and driven elements, the lock-up clutch including an apply chamber and a release chamber; a lock-up clutch control arrangement comprising: a lock-up clutch valve for controlling a supply of an apply pressure to the apply chamber and a supply of a release pressure to the release chamber, the lock-up clutch control valve including a spool, the spool including: means defining a first effective area against which the release pressure acts, and means defining a second effective area against which the apply pressure acts, the first effective area being arranged to produce a bias which acts in a first direction when exposed to the release pressure, the second effective area being arranged to produce a bias which acts in a second direction when exposed to the apply pressure, the first and second effective areas being essentially equal in effective area; and solenoid valve means for producing a pressure which is supplied to the lock-up clutch valve and used to control the levels of the apply and release pressures.

A second embodiment of the present invention comes in a transmission an input element in drive connection with a prime mover; an output element in drive connection with a gear train; a lock-up clutch operatively arranged between the input element and the output element, the lock-up clutch including an apply chamber in which an apply pressure is supplied and a release chamber into which a release pressure is supplied; a lock-up clutch valve for controlling the supply of apply pressure to the apply chamber and the supply of release pressure to the release chamber, the lock-up clutch control valve including a spool, the spool having a first effective area against which the release pressure acts and a second effective area which is essentially equal to the first area and against which the apply pressure acts, the first effective area being arranged to produce a bias which acts in a first direction when exposed to the release pressure, the second effective area being arranged to produce a bias which acts in a second direction when exposed to the apply pressure; a solenoid valve for producing a first variable level control pressure; and switching valve means, the switching valve means being responsive to the variable level pressure produced by the solenoid valve and arranged to supply a second control pressure to the lock-up clutch control valve.

BRIEF DESCRIPTION OF THE DRAWINGS

FIG. 5 is a schematic diagram showing the concept used in connection with the lock-up control valve according to the present invention;

FIG. 6 is a chart which shows the changes in solenoid pressure and the attendant changes in lock-up status;

FIG. 7 shows a second embodiment of the present invention; and

FIG. 8 is a schematic diagram showing the relationships which characterize the prior art discussed in the opening paragraphs of the instant disclosure.

DETAILED DESCRIPTION OF THE PREFERRED EMBODIMENTS

Figure 1:
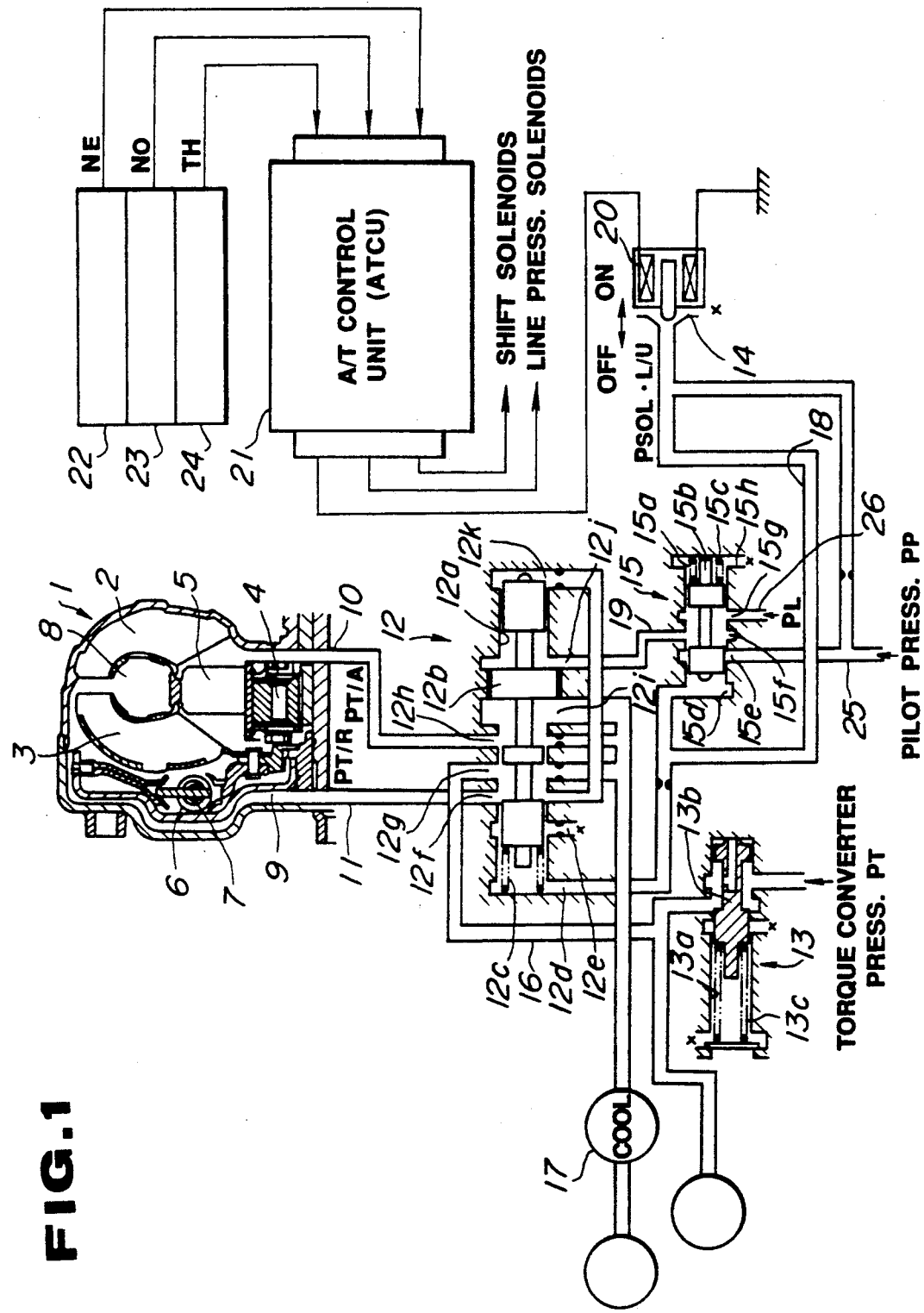
FIG. 1 shows a lock-up control arrangement according to a first embodiment of the present invention.

FIG. 1 shows a first embodiment of the present invention. In this arrangement a torque converter 1 is operatively connected with a prime mover such as an internal combustion engine (not shown) and includes a pump impeller 2 (input element); a turbine runner 3 (output element); a one way clutch 4; and a stator 5 which is operatively connected to a case by way of the one-way clutch 4. The pump impeller 2 and the turbine runner 3 are arranged to be selectively connected by a lock-up clutch 6. A clutch damper 7 which includes a torsion spring is operatively interposed between the turbine runner 3 and the lock-up clutch 6 in order to attenuate large torque fluctuations which tend to occur during lock-up.

The hydraulic control arrangement via which the lock-up clutch is controlled is fluidly communicated with a lock-up clutch apply chamber 8 (hereinafter referred to as apply chamber) and a lock-up clutch release chamber 9 (hereinafter referred to as a release chamber) of a thinly configured chamber arrangement, by way of apply pressure and release pressure conduits 10, 11. Conduit 10 transmits an apply pressure $P_{T/A}$ while conduit 11 transmits a release pressure $P_{T/R}$ from a lock-up control valve 12. The arrangement further includes a T/C relief valve 13 which regulates a basic pressure ($P_T$) to a constant level; a lock-up solenoid valve 14 which modulates a supply of pilot pressure $P_P$ to form a solenoid pressure $P_{SOL.LU}$ in response to an externally applied duty signal; and a switching valve 15 which is supplied with both pilot pressure $P_P$ and line pressure $P_L$ and which supplies line pressure to the lock-up clutch control valve 12 in place of pilot pressure when full lock up is required.

The lock-up control valve 12 controls the pressure levels which determine if the lock-up clutch is released, conditioned for slip lock-up or conditioned to produce full lock-up. This valve comprises a bore 12a in which a spool 12b is reciprocatively disposed and subject to a bias by a spring 12c. The bore is formed with ports 12e-12k. The spool is formed with effective areas A1–A4 which are acted on by solenoid, apply and release pressures.

Port 12d is supplied with solenoid pressure from the lock-up solenoid valve 14 via conduit 18; port 12e is used as a drain; port 12g communicates with torque converter pressure conduit 16; port 12h communicates with apply pressure conduit 10; port 12i communicates with port 12g; port 12h communicates with the oil cooler 17; port 12j communicates with switching pressure conduit 19 into which one of line pressure and pilot pressure are supplied.

The release valve 13 comprises a valve bore 13a in which a spool 13b and a spring 13c are disposed. As will be readily appreciated, when the bias produced by the torque converter pressure $P_T$ exceeds that produced by the spring 13c a drain port is opened to relief the excess.

The lock-up solenoid valve 14 is arranged so that when the solenoid 20 is de-energized (OFF) port 12d is supplied with pilot pressure $P_P$ while when energized (ON) the port 12d is connected with a drain. Depending on the duty cycle of the signal applied to the solenoid 20 the level of solenoid pressure $P_{SOL.L/U}$ which is supplied to port 12d is variable between the above mentioned limits.

The switching valve 15 comprises a bore 15a, a spool 15b and a spring 15c. The bore is formed with ports 15d-15h. Port 15d communicates with solenoid pressure conduit 18, port 15e communicates with pilot pressure conduit 25, port 15f communicates with switching pressure conduit 19, port 15g communicates with line pressure conduit 26 and port 15h acts as a drain.

In this embodiment the switching valve is arranged to respond to a solenoid pressure $P_{SOL.L/U}$ of 0.5 kgm.cm² (for example) in a manner to switch from an open torque converter position to one which induces slip lock-up (and thus outputs pilot level pressure) and from slip lock-up to fully lock-up when full pilot pressure level is reached (at which line pressure is output).

The solenoid 20 is operatively connected with an A/T control circuit (ACTU) 21 which receives data inputs from a plurality of sensors such as engine speed sensor 22, a transmission output shaft rotational speed sensor 23 and a throttle valve position sensor 24. The outputs Ne, No and TH of these sensor are applied to the ATCU wherein they are processed (using a suitable program) in a manner to determine which mode of operation the lock-up clutch should be conditioned to produce. In accordance with this decision the duty cycle of the signal applied to the solenoid is determined. For example, the schedule shown in FIG. 4 can be used following a 3-4 upshift to determine which mode of operation should be implemented and when. After the appropriate mode is ascertained a suitable driver circuit can be induced to output a signal having a duty cycle which will induce the switching valve 13 to output the required pressure to the lock-up control valve 12.

Figure 2:
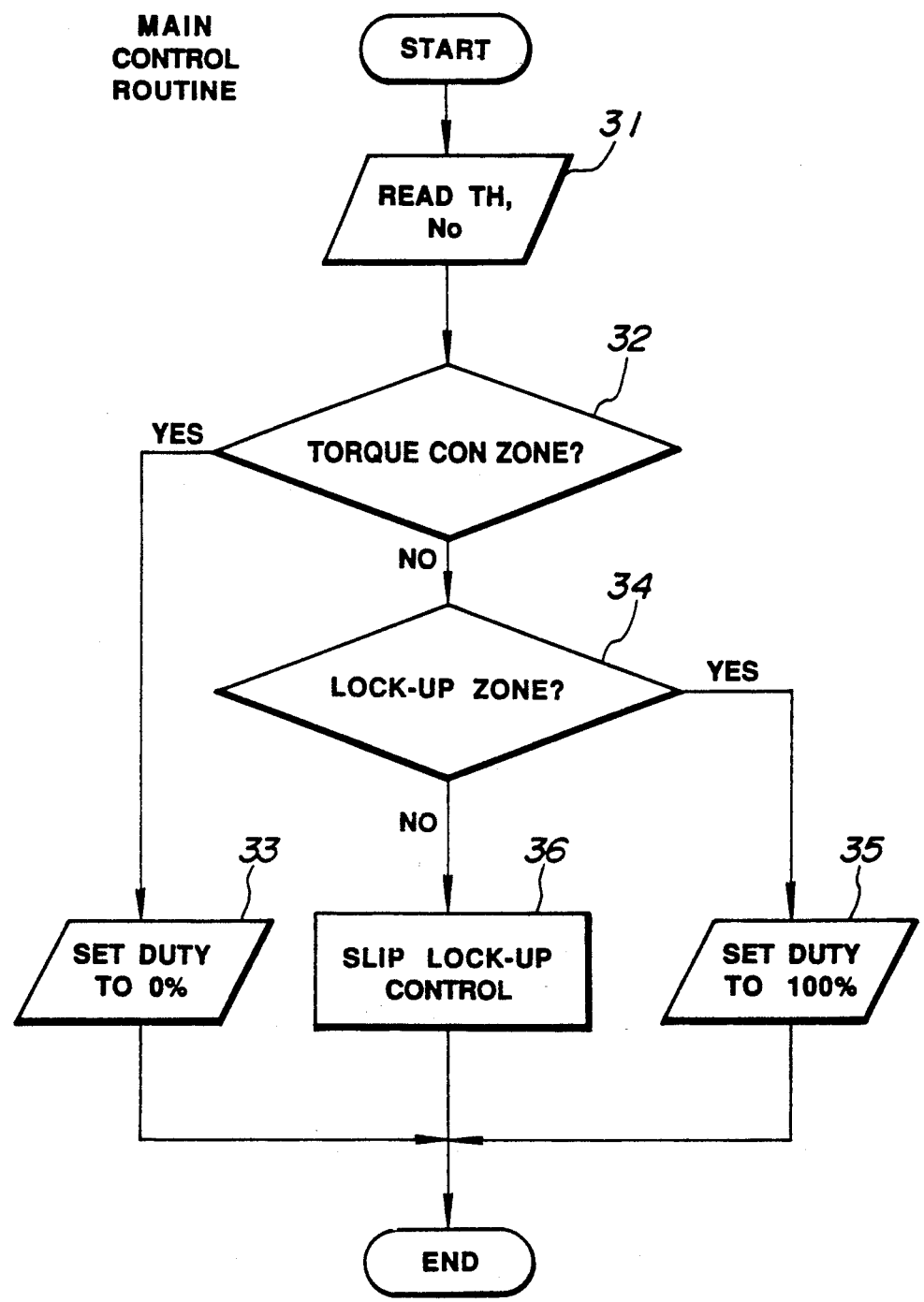
FIG. 2 is a flow chart depicting a main control routine which is used in connection with the control of the first embodiment.
Figure 3:
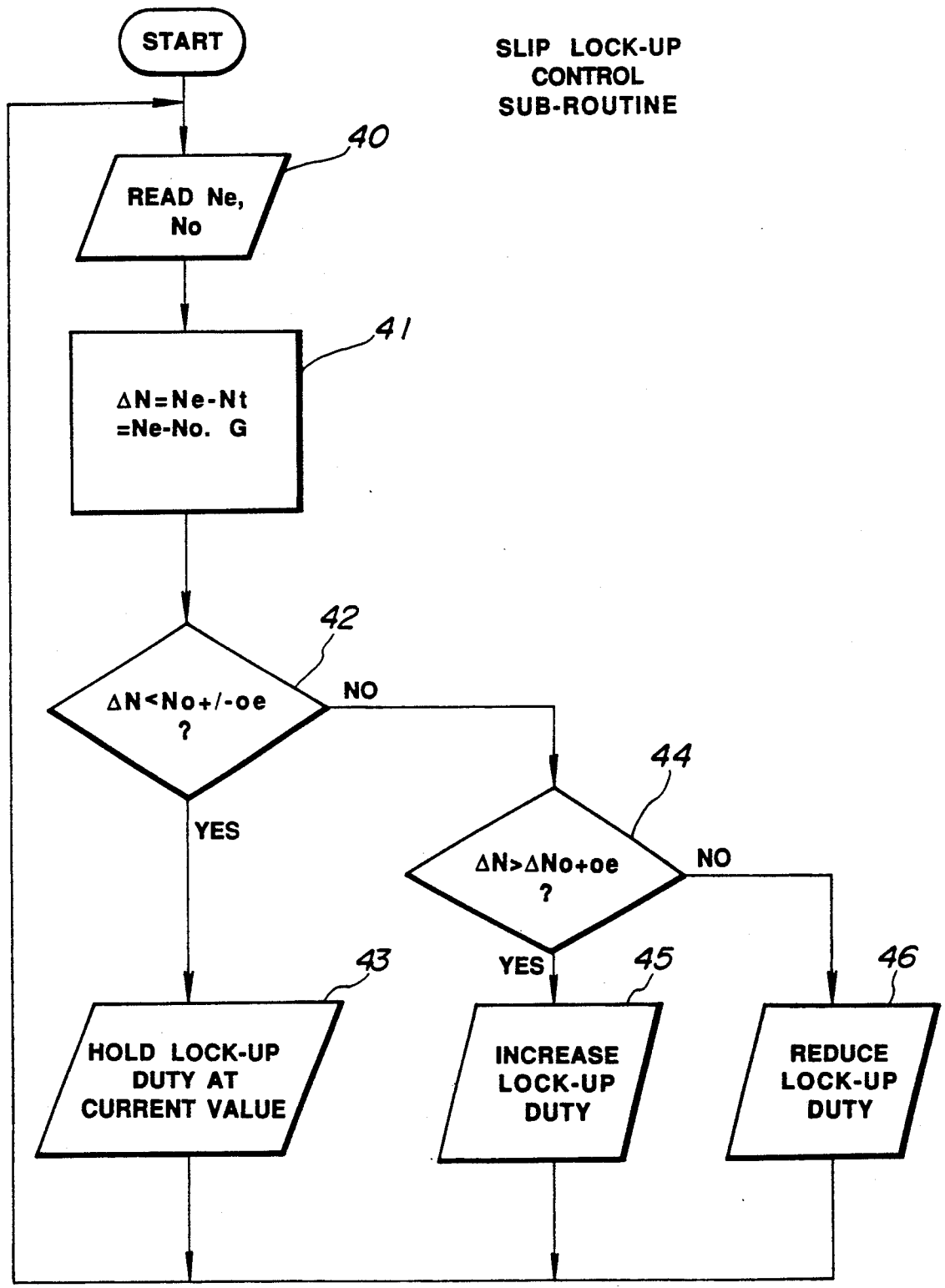
FIG. 3 is a flow chart which depicts a slip lock-up sub routine which is run in connection with the present invention.

FIG. 2 depicts in flow chart form, a main control routine which is used in connection with the control of the above described arrangement. FIG. 3 depicts a sub routine which is used to increase and decrease the duty cycle between the values for open and full lock-up mode of operation.

In connection with FIG. 2 the first step of the routine depicted therein is such as to read in engine load and vehicle speed data. This can be achieved by sampling the outputs of the throttle valve position sensor 22 and the transmission output shaft rotational speed sensor 23. At step 32 this data is used to determine what lock-up clutch condition is required under the instant set of operating conditions. In other words this step determines if a torque converter mode (no lock-up) is required or not. If no lock-up is required then the routine flows to step 33 wherein a command to set the duty cycle to 0% is issued. This of course is such as to de-energize the solenoid (OFF) and thus induce the situation wherein full level pilot pressure $P_p$ is supplied to the ports 12d and 15d.

Figure 4:
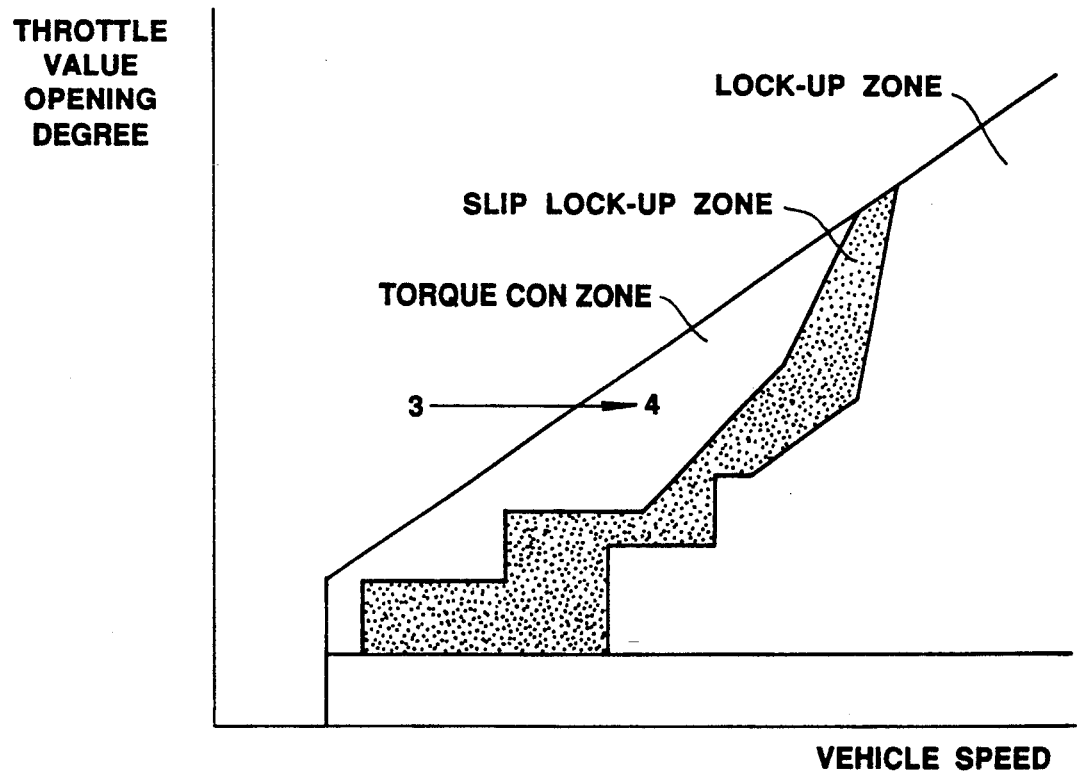
FIG. 4 is a graph showing the various operation zones in terms of engine load and vehicle speed.

On the other hand if the outcome of step 32 is such as to indicate that a torque converter mode is not required then the routine flows to step 34 wherein the instant engine speed and vehicle speed values are used in connection with mapped data of the nature shown in FIG. 4 if full lock is required or not. In the event that full lock-up is indicated as being the appropriate mode of operation the routine flows to step 35 wherein a command to raise the duty cycle of the signal applied to the solenoid to 100%. This of course induces the solenoid 20 to remain constantly energized and maintain the drain port of the valve 14 open. This reduces the pressure prevailing in ports 12d, 15d to zero.

However, in the event that the need for full lock-up is not indicated, then the routine flows to step 36. In this step the sub-routine shown in FIG. 3 is run. This routine supervises the control of the slip lock-up mode. The first step (40) of this sub-routine is such as to read in the engine speed Ne, engine load TH and vehicle speed (transmission output shaft rotational speed No). At step 41 the slip amount $\Delta N$ is derived using the following equations:

$$\Delta N = Ne - Nt$$
$$= Ne - No \times G$$

where:
Nt denotes the rotational speed of the turbine; and
G denotes the instant gear ratio.

At step 42 it is determined if the instant slip ratio $\Delta N$ is compared with a target slip ratio value $\Delta No$. Depending on the outcome of this comparison the duty cycle is either incrementally increased, incrementally decreased or maintained at the instant value. That is to say, in the event that the value of $\Delta N$ is $\leq \Delta No +/- \alpha$ then the routine flows to step 43 wherein a command to hold the duty cycle at its current value is issued. However, if $\Delta N$ is $> \Delta No + \alpha$ then the routine goes to step 45 wherein a command to increase the duty cycle by a predetermined amount (by way of example) is issued. On the other hand if $\Delta N < \Delta No - \alpha$ then the routine goes to step 46 wherein a duty cycle reduction command is issued.

As will be appreciated, after one or more runs of the instant sub-routine the value of $\Delta N$ will brought in the predetermined range of $\Delta No$.

FULL LOCK-UP

The pressure control provided by lock-up valve 12 is such that during full lock-up operation, the release pressure $P_{T/R}$ is reduced to zero. Viz., at this time the spool 15b of the switching valve 15 assumes a position illustrated in FIG. 1 and whereby line pressure is transmitted from port 15g to port 15f, into conduit 19 in a manner to be applied to area $A_3$ (as schematically indicated in FIG. 5). This moves the valve spool 12b sufficiently to open drain port 12e and reduce the $P_{T/R}$ to zero.

Under these conditions the following conditions are established.

$$A_1 \times P_{SOL.L/U} + A_2 \times P_{T/A} + F_s < A_3 \times P_L \qquad (2)$$

As a result full lock-up is maintained.

In the case pilot pressure is permitted to act on area $A_3$ the following relationship is established.

$$A_1 \times P_{SOL.L/U} + A_2 \times P_{T/A} + F_S > A_3 \times P_p \qquad (2)$$

Under these conditions the valve spool 12b cannot be moved across to the left as seen in the drawings in the manner which occurs when line pressure is applied.

As shown in FIG. 6 under full lock-up conditions the pressure differential ΔP is such as to exhibit a notably high value. This is such as to adequately ensure that the full lock-up conditions are maintained.

SLIP LOCK-UP

When slip lock-up conditions are induced the following relationship can be considered to exist $$A_1 \times P_{SOL.L/U} + A_2 \times P_{T/A} + F_S = A_3 \times P_P + A_4 \times P_{T/R} \quad (3)$$

$$P_{T/R} = \frac{1}{A_4} \{A_1 \times P_{SOL.L/U} + A_2 \times P_{T/A} + F_S - A_3 \times P_P\}$$

Therefore the pressure differential ΔP is given by:

$$\Delta P = P_{T/A} - P_{T/R}$$

$$= \frac{1}{A_2} \{(A_4 - A_2) P_{T/A} + A_3 P_P - A_1 P_{SOL.L/U} - F_S\}$$

However, $P_P$ and $F_S$ are fixed, accordingly:

$$\frac{A_3}{A_4} P_P - \frac{F_S}{A_4} = C \text{(a constant)}$$

whereby $$\Delta P = \frac{A_4 - A_2}{A_4} P_{T/A} - \frac{A_1}{A_4} P_{SOL.L/U} + C \quad (3)$$

Further $A_1 = A_2 = A_3$ whereby $$\Delta P = P_{SOL.L/U} + C$$

Therefore, ΔP varies in accordance with only the solenoid pressure. That is to say, $\Delta P = f(P_{SOL.L/U})$.

As a result, during slip lock-up control, if the accelerator pedal depression is changed, even though the apply pressure PT/A varies in response and thus induces a change in ΔP, as the latter varies only in response to the level of the solenoid pressure $P_{SOL.L/U}$ the pressure differential does not deviate from the desired target value.

Further, the coefficient of the solenoid pressure can be considered to be 1 at the most. Accordingly, the effect of deviations in the solenoid valve per se are reduced, and even through small values are preferred, there is a limit below which the ΔP value cannot be reduced. The $P_{SOL.L/U}$ pressure is formed by suitably draining off the basic pressure.

With this above described arrangement the following effects are derived.

[1] During slip lock-up, if a shift occurs and the line pressure $P_L$ is changed, there is no overall change in the pressure differential ΔP thus obviating any tendency for vibration to be produced in the lock-up damper.

[2] During slip lock-up if the accelerator pedal is pumped, the feedback supervision of the engine speed Ne and the turbine speed Nt is improved and the amount of slip ΔN is quickly matched with the target value ΔNo, thus improving the driving characteristics of the vehicle.

[3] During low engine speed modes of operation, even though the output of the oil pump is accordingly low, at the initial stages of slip lock-up hunting of the amount slip produced is obviated.

[4] It is possible to achieve a notable production cost reduction as the lock-up control valve 12 allows for a given amount of variation. For example, in the case the coefficient of the $P_{SOL.L/U}$ is 3, as compared with the instant embodiment (coefficient 1) the production variation becomes ⅓.

[5] When the mode of operation changes from open converter to slip lock-up the chances of full lock up taking place are eliminated as full lock-up can occur only after a marked increase in the solenoid pressure has occurred above the maximum value at which slip is permitted (see FIG. 6).

It will be appreciated that the construction and arrangement of the present invention is not limited to the above described embodiment and that various changes may be implemented without deviating from the scope of the same. For example, a second embodiment shown in FIG. 7 is such that the switching valve 15 is replaced with a full lock-up control valve 15A and a slip lock-up control valve 15B. The construction of the lock-up control valve 12' is modified in a manner wherein port 12j is replaced with ports 12l, 12m and 12n. In this case during open converter operation, neither conduits 19A, 19B are supplied with pilot pressure. On the other hand, when slip lock is required, only conduit 19A is pressurized, while in the case of full lock-up both are supplied with pilot pressure. This enables the same pressure to be applied to three different pressure responsive areas, one for each of the three modes of operation.

What is claimed is:

1. A transmission comprising:
   an input element in drive connection with a prime mover;
   an output element in drive connection with a gear train;
   a lock-up clutch operatively arranged between said input element and said output element, said lock-up clutch including an apply chamber in which an apply pressure is supplied and a release chamber into which a release pressure is supplied;
   a source of line pressure;
   a source of constant level pilot pressure;
   a lock-up clutch valve for controlling the supply of apply pressure to said apply chamber and the supply of release pressure to said release chamber, said lock-up clutch control valve including a spool, said spool having a first effective area against which said release pressure acts and a second effective area which is essentially equal to the first area and against which said apply pressure acts, said first effective area being arranged to produce a bias which acts in a first direction when exposed to said release pressure, said second effective area being arranged to produce a bias which acts in a second direction when exposed to said apply pressure;
   a solenoid valve for providing a first variable level control pressure, said solenoid valve selectively reducing the pilot pressure to form said first variable level control pressure; and
   switching valve means, said switching valve means being responsive to the variable level pressure produced by said solenoid valve and arranged to supply a second control pressure to the lock-up clutch control valve, said switching valve being supplied said line pressure and said pilot pressure, said switching valve being arranged to be responsive to said first variable level control pressure in a manner wherein, when said first variable level control pressure is below a predetermined level, said switching valve supplies said pilot pressure to said lock-up control valve as said second control pressure and supplies line pressure to said lock-up control valve when the level of said first variable control pressure reaches said predetermined level.

2. A transmission as claimed in claim 1 further comprising a source of pilot pressure, said pilot pressure exhibiting a constant pressure level, said pilot pressure being supplied to said switching valve as a source of said second control pressure, and to said solenoid valve, said solenoid valve selectively reducing the pilot pressure to form said first variable level control pressure.

3. A transmission as claimed in claim 1 wherein said first variable level control pressure is supplied to said lock-up clutch control valve and used to produce a third bias which tends to move said spool in said first direction, and wherein said second control pressure which is supplied to said lock-up control valve tends to produce a fourth bias which acts in a direction opposite to that in which said third bias acts.

4. A transmission as claimed in claim 1 further comprising a source of torque converter pressure, said torque converter pressure source being fluidly communicated with said lock-up control valve and used as a source of said apply and release pressures, said torque converter pressure source being arranged to limit the level of said torque converter pressure to a predetermined maximum level.

5. A transmission as claimed in claim 1 wherein said lock-up control valve further comprises: means defining a third effective area and a fourth effective area and wherein said switching valve means is responsive to the variable level pressure produced by said solenoid valve and arranged to supply said second control pressure to one or both of said third and fourth effective areas.

6. A transmission comprising:
an input element in drive connection with a prime mover;
an output element in drive connection with a gear train;
a lock-up clutch operatively arranged between said input element and said output element, said lock-up clutch including an apply chamber in which an apply pressure is supplied and a release chamber into which a release pressure is supplied;
a source of line pressure;
a source of constant level pilot pressure;
a lock-up clutch valve for controlling the supply of apply pressure to said apply chamber and the supply of release pressure to said release chamber;
a solenoid valve for providing a first variable level control pressure, said solenoid valve selectively reducing the pilot pressure to form said first variable level control pressure; and
switching valve means, said switching valve means being responsive to the variable level pressure produced by said solenoid valve and arranged to supply a second control pressure to the lock-up clutch control valve, said switching valve being supplied with said line pressure and said pilot pressure, said switching valve being arranged to be responsive to said first variable level control pressure in a manner wherein, when said first variable level control pressure is below a predetermined level, said switching valve supplies said pilot pressure to said lock-up control valve as said second control pressure and supplies said line pressure to said lock-up control valve when the level of said first variable control pressure reaches said predetermined level.

7. A transmission comprising:
an input element in drive connection with a prime mover;
an output element in drive connection with a gear train;
a lock-up clutch operatively arranged between said input element and said output element, said lock-up clutch including an apply chamber in which an apply pressure is supplied and a release chamber into which a release pressure is supplied;
a source of line pressure;
a source of constant level pilot pressure;
a lock-up clutch valve for controlling the supply of apply pressure to said apply chamber and the supply of release pressure to said release chamber;
a solenoid valve for providing a first variable level control pressure, said solenoid valve selectively reducing the pilot pressure to form said first variable level control pressure; and
switching valve means, said switching valve means being responsive to the variable level pressure produced by said solenoid valve and selectively supplying one of said line pressure and pilot pressure depending upon the pressure level of said first variable control pressure.

8. An automatic transmission comprising:
an input element in drive connection with a prime mover;
an output element in drive connection with a gear train;
a lock-up clutch operatively arranged between said input element and said output element, said lock-up clutch including an apply chamber in which an apply pressure is supplied and a release chamber into which a release pressure is supplied, which lock-up clutch being variable in operational mode between a converter mode, in which an output torque is transmitted in an input shaft of said automatic power transmission via a torque converter, and a lock-up mode, in which the engine output torque is directly transmitted to said input shaft of said automatic power transmission, across a slip lock-up mode in which the magnitude of slippage in the lock-up clutch is variable depending upon the pressure difference between the fluid pressures in said apply chamber and said release chamber;
a source of line pressure;
a source of constant level pilot pressure;
a lock-up clutch valve for controlling the supply of apply pressure to said apply chamber and the supply of release pressure to said release chamber;
a solenoid valve for providing a first variable level control pressure, said solenoid valve selectively reducing the pilot pressure to form said first variable level control pressure; and
switching valve means, said switching valve means being responsive to the variable level pressure produced by said solenoid valve and arranged to supply a second control pressure to the lock-up clutch control valve, said switching valve being supplied said line pressure and said pilot pressure, said switching valve being arranged to be responsive to said first variable level control pressure in a manner wherein, when said first variable level control pressure is below a predetermined level, said switching valve supplies said pilot pressure to said lock-up control valve as said second control pressure and supplies said line pressure to said lock-up control valve when the level of said first variable control pressure reaches said predetermined level.

9. An automatic transmission comprising:

an input element in drive connection with a prime mover;

an output element in drive connection with a gear train;

a lock-up clutch operatively arranged between said input element and said output element, said lock-up clutch including an apply chamber in which an apply pressure is supplied and a release chamber into which a release pressure is supplied, wherein said lock-up clutch being variable in operational mode between a converter mode, in which an output torque is transmitted in an input shaft of said automatic power transmission via a torque converter, and a lock-up mode, in which the engine output torque is directly transmitted to said input shaft of said automatic power transmission, across a slip lock-up mode in which a magnitude of slippage in the lock-up clutch is variable depending upon the pressure difference between the fluid pressures in said apply chamber and said release chamber;

a source of line pressure;

a source of constant level pilot pressure;

a lock-up clutch valve for controlling the supply of apply pressure to said apply chamber and the supply of release pressure to said release chamber;

a solenoid valve for providing a first variable level control pressure, said solenoid valve selectively reducing the pilot pressure to form said first variable level control pressure; and switching valve means, said switching valve means being responsive to the variable level pressure produced by said solenoid valve and selectively supplying one of said line pressure and said pilot pressure depending upon the pressure level of said first variable control pressure.

10. An automatic transmission comprising:

an input element in drive connection with a prime mover;

an output element in drive connection with a gear train;

a lock-up clutch operatively arranged between said input element and said output element, said lock-up clutch including an apply chamber in which an apply pressure is supplied and a release chamber into which a release pressure is supplied, wherein said lock-up clutch being variable in operational mode between a converter mode, in which an output torque is transmitted in an input shaft of said automatic power transmission via a torque converter, and a lock-up mode, in which the engine output torque is directly transmitted to said input shaft of said automatic power transmission, across a slip lock-up mode in which a magnitude of slippage in the lock-up clutch is variable depending upon the pressure difference between the fluid pressures in said apply chamber and said release chamber;

a source of line pressure;

a source of constant level pilot pressure;

a lock-up clutch valve for controlling the supply of apply pressure to said apply chamber and the supply of release pressure to said release chamber;

a solenoid valve for providing a first variable level control pressure, said solenoid valve selectively reducing the pilot pressure to form said first variable level control pressure depending upon a demand in the operational mode of said torque converter; and switching valve means, said switching valve means being responsive to the variable level pressure produced by said solenoid valve and selectively supplying one of said line pressure and pilot pressure depending upon the pressure level of said first variable control pressure thereby reflecting said demand in the operational mode of said torque converter.

* * * * *